(12) United States Patent
Hitaka

(10) Patent No.: US 10,733,059 B2
(45) Date of Patent: Aug. 4, 2020

(54) IMAGE FORMATION APPARATUS WITH TWO TYPES OF STORAGE

(71) Applicant: KONICA MINOLTA, INC., Chiyoda-ku, Tokyo (JP)

(72) Inventor: Masatoshi Hitaka, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/003,920

(22) Filed: Jun. 8, 2018

(65) Prior Publication Data

US 2018/0357128 A1 Dec. 13, 2018

(30) Foreign Application Priority Data

Jun. 9, 2017 (JP) .................................. 2017-114453

(51) Int. Cl.
| | |
|---|---|
| *G06F 11/14* | (2006.01) |
| *G06F 3/12* | (2006.01) |
| *G06F 3/06* | (2006.01) |
| *H04N 1/00* | (2006.01) |

(52) U.S. Cl.
CPC ........ *G06F 11/1451* (2013.01); *G06F 3/0604* (2013.01); *G06F 3/0646* (2013.01); *G06F 3/0688* (2013.01); *G06F 3/121* (2013.01); *G06F 3/1224* (2013.01); *G06F 11/1441* (2013.01); *H04N 1/00962* (2013.01); *G06F 2201/81* (2013.01); *G06F 2201/84* (2013.01)

(58) Field of Classification Search
CPC .... G06F 3/1225; G06F 3/1204; G06F 3/1205; G06F 3/1227; G06F 3/1247; G06F 3/1258; G06F 1/26; H04N 1/00482; H04N 1/00938; H04N 2201/0094
See application file for complete search history.

(56) References Cited

U.S. PATENT DOCUMENTS

| | | | | |
|---|---|---|---|---|
| 9,946,477 | B2* | 4/2018 | Yamaura | ............... G06F 3/0619 |
| 2005/0007812 | A1* | 1/2005 | Kowari | ............... G03G 15/553 |
| | | | | 365/149 |
| 2005/0138447 | A1* | 6/2005 | Kobayashi | ......... H04N 1/00885 |
| | | | | 713/300 |

FOREIGN PATENT DOCUMENTS

| | | |
|---|---|---|
| JP | 2004361544 A | 12/2004 |
| JP | 2005193652 A | 7/2005 |
| JP | 2007190822 A | 8/2007 |
| JP | 2016118862 A | 6/2016 |

\* cited by examiner

*Primary Examiner* — Iriana Cruz
(74) *Attorney, Agent, or Firm* — Holtz, Holtz & Volek PC

(57) ABSTRACT

An image formation apparatus includes a first non-volatile memory, a second non-volatile memory smaller in allowable number of times of rewriting of data than the first non-volatile memory and higher in rate of reading of data than the first non-volatile memory, and a processor. The processor backs up control data for the image formation apparatus to the first non-volatile memory, backs up the control data to the second non-volatile memory less frequently than to the first non-volatile memory, and reads the control data from the second non-volatile memory when the control data stored in the first non-volatile memory matches with the control data stored in the second non-volatile memory at the time of start-up of the image formation apparatus and otherwise reads the control data from the first non-volatile memory.

18 Claims, 14 Drawing Sheets

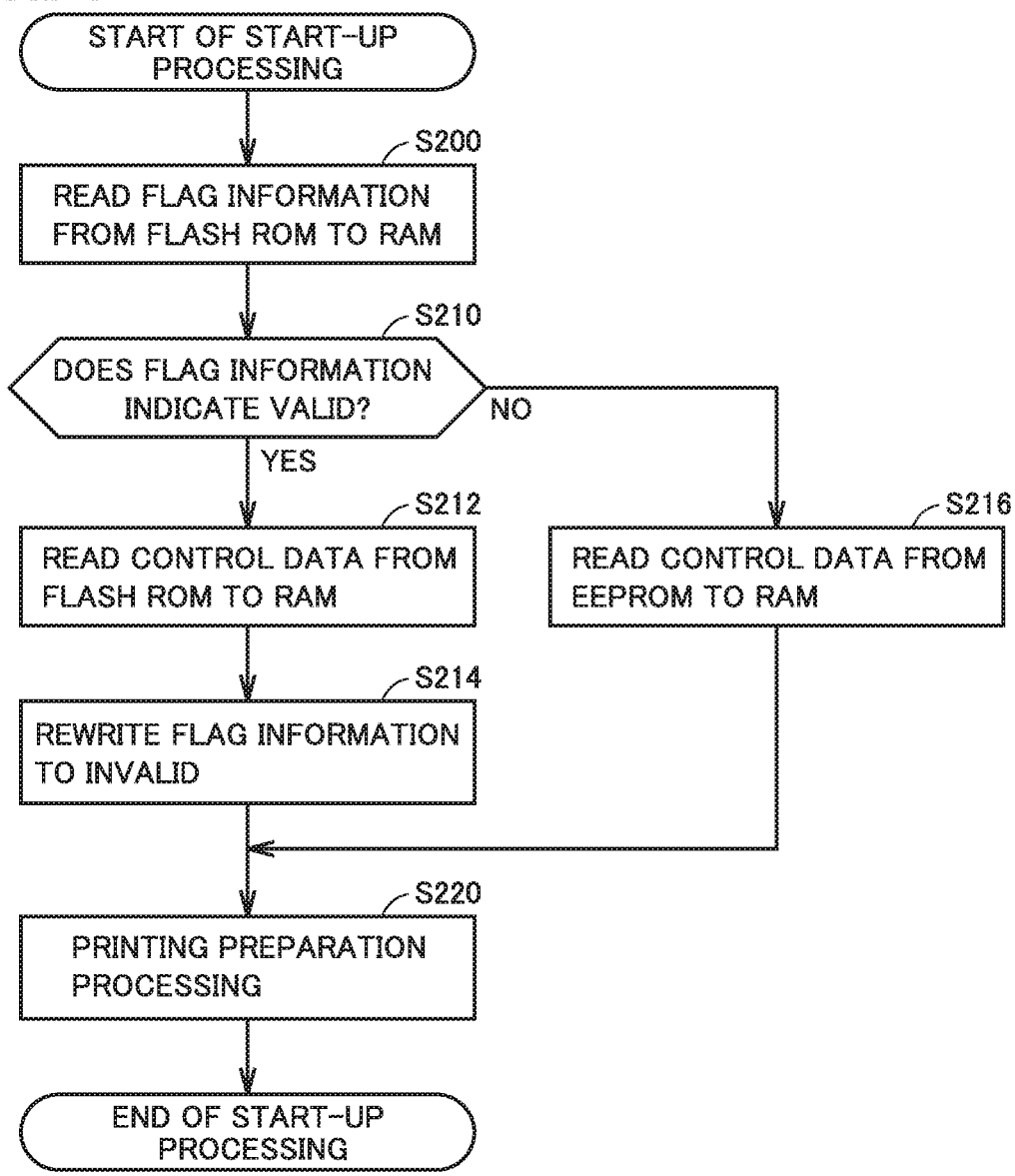

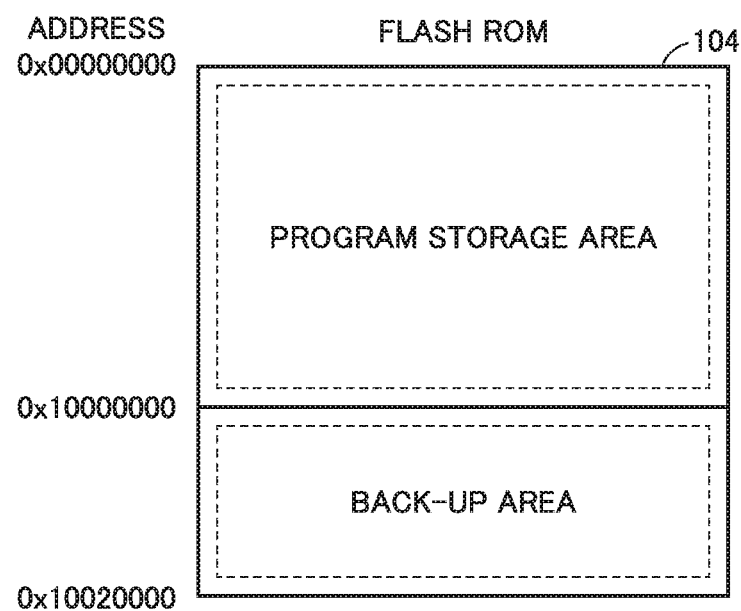

IMAGE FORMATION APPARATUS WITH TWO TYPES OF STORAGE

The entire disclosure of Japanese Patent Application No. 2017-114453 filed on Jun. 9, 2017 is incorporated herein by reference in its entirety.

BACKGROUND

Technological Field

The present disclosure relates to a technique for shortening a time period for start-up while a lifetime of a non-volatile storage device is extended.

Description of the Related Art

An image formation apparatus incorporates a non-volatile storage device capable of holding data even while electric power is not fed and a volatile storage device incapable of holding data while electric power is not fed. Since the volatile storage device is higher in rate of reading and writing of data than the non-volatile storage device, the image formation apparatus reads and writes control data from and into the volatile storage device while it operates. The image formation apparatus backs up the control data in the volatile storage device to the non-volatile storage device before its operations are stopped. At the time of start-up, the image formation apparatus reads the control data from the volatile storage device to the non-volatile storage device.

Various techniques have been developed in connection with reading and writing of data from and into a volatile storage device and a non-volatile storage device. For example, Japanese Laid-Open Patent Publication No. 2016-118862 discloses an information processing apparatus for "shortening a time period from turn-on of a power supply until a user is able to perform an operation" by reading only data necessary for start-up.

Japanese Laid-Open Patent Publication No. 2004-361544 discloses an image formation apparatus "being free from restrictions on the number of times of writing and configured to update lifetime management information and store the information in storage means also while a main power supply is turned off."

Japanese Laid-Open Patent Publication No. 2007-190822 discloses an image formation apparatus "capable of returning to a state immediately available for use by temporarily stopping checking of data in a storage area from which the data has been read before turn-off of a power supply, which had been an abend, and resuming checking as soon as formation of an image ends."

Japanese Laid-Open Patent Publication No. 2005-193652 discloses an image processing apparatus "capable of reading control data for control of the image processing apparatus from volatile second storage means different from non-volatile first storage means when transition from a second electric power supply state low in power consumption to a first electric power supply state is made, and promptly returning from a power saving mode to a normal operation mode."

Depending on a type of an image formation apparatus, a plurality of non-volatile storage devices different in characteristics such as an electronically erasable and programmable read only memory (EEPROM) and a flash read only memory (ROM) may be mounted thereon. Normally, the EEPROM is greater in allowable number of times of rewriting than the flash ROM. The "allowable number of times of rewriting" herein means the upper limit number that data can be written in an internal storage area. Namely, the "allowable number of times of rewriting" means a lifetime until a failure occurs or until timing of replacement comes.

The flash ROM is higher in rate of reading than the EEPROM. The "rate of reading" herein means an amount of data which can be read from an internal storage area per unit time. Since the "rate of reading" is a concept correlating with a "time period for reading" required for reading of data from an internal storage area, the "rate of reading" may encompass the concept of the "time period for reading." Therefore, in the following, the term "rate of reading" may be used and the term "time period for reading" may be used.

For precautionary measures against sudden cut-off of a power supply, control data should periodically be backed up. When back-up is frequent, the number of times of writing of data increases. In order to extend a lifetime of a non-volatile storage device, back-up to the EEPROM greater in allowable number of times of rewrite is desirable. In order to shorten a time period for start-up after recovery, however, back-up to the flash ROM higher in rate of reading is desirable. With such non-volatile storage devices different in characteristics, a time period for starting up an image formation apparatus is desirably shortened while a lifetime of non-volatile storage devices is extended. Japanese Laid-Open Patent Publications Nos. 2016-118862, 2004-361544, 2007-190822, and 2005-193652 disclose no solution to this problem.

SUMMARY

The present disclosure was made to solve the problem as described above, and an object in one aspect is to provide an image formation apparatus capable of achieving a shortened time period for start-up while a lifetime of non-volatile storage devices is extended. An object in another aspect is to provide an information processing apparatus capable of achieving a shortened time period for start-up while a lifetime of non-volatile storage devices is extended. An object in another aspect is to provide an information processing method capable of achieving a shortened time period for start-up while a lifetime of non-volatile storage devices is extended. An object in another aspect is to provide an information processing program capable of achieving a shortened time period for start-up while a lifetime of non-volatile storage devices is extended.

To achieve at least one of the abovementioned objects, according to an aspect of the present invention, an image formation apparatus reflecting one aspect of the present invention comprises a first non-volatile memory, a second non-volatile memory smaller in allowable number of times of rewriting of data than the first non-volatile memory and higher in rate of reading of data than the first non-volatile memory, a first back-up unit configured to back up control data used at the time of start-up of the image formation apparatus to the first non-volatile memory, and a second back-up unit configured to back up the control data to the second non-volatile memory. A frequency of back-up of the control data to the second non-volatile memory is lower than a frequency of back-up of the control data to the first non-volatile memory. The image formation apparatus further includes a reading unit configured to read the control data from the second non-volatile memory when the control data stored in the first non-volatile memory matches with the control data stored in the second non-volatile memory at the time of start-up of the image formation apparatus and read the control data from the first non-volatile memory when the control data stored in the first non-volatile memory does not match with the control data stored in the second non-volatile memory at the time of start-up of the image formation apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 13 is a diagram showing a specific example of processing for starting up the image formation apparatus according to the embodiment.

FIG. 14 is a conceptual diagram schematically showing a storage area of the flash ROM.

DETAILED DESCRIPTION OF EMBODIMENTS

Figure 1:
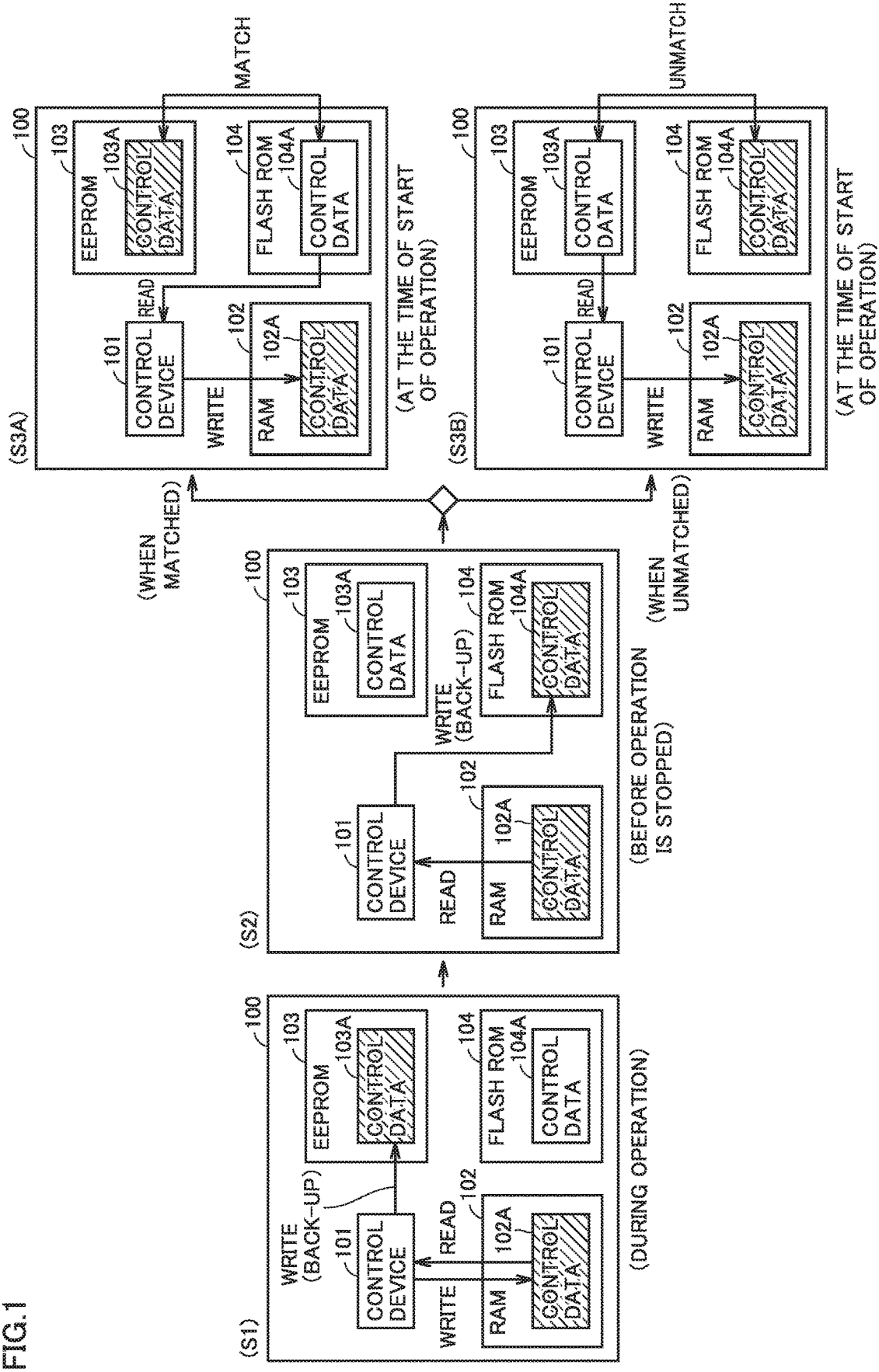
FIG. 1 is a conceptual diagram schematically showing back-up processing in an image formation apparatus according to an embodiment.

Hereinafter, one or more embodiments of the present invention will be described with reference to the drawings. However, the scope of the invention is not limited to the disclosed embodiments.

Each embodiment according to the present invention will be described below with reference to the drawings. The same elements and components in the description below have the same reference characters allotted and their labels and functions are also the same. Therefore, detailed description thereof will not be repeated. Each embodiment and each modification described below may selectively be combined as appropriate.

A. Overview of Processing

Overview of processing in an image formation apparatus 100 will be described with reference to FIG. 1. FIG. 1 is a conceptual diagram schematically showing back-up processing in image formation apparatus 100.

As shown in FIG. 1, image formation apparatus 100 includes, as main hardware components, a control device 101, at least one non-volatile memory, and at least two volatile memories.

For example, a random access memory (RAM) 102 is adopted for the volatile memory of image formation apparatus 100. Though description will be given below with reference to RAM 102, the volatile memory is not limited to RAM 102 and any storage medium higher in rate of reading than the volatile memory is adopted for the volatile memory of image formation apparatus 100.

For example, an EEPROM 103 (a first non-volatile memory) and a flash ROM 104 (a second non-volatile memory) are adopted for the non-volatile memories of image formation apparatus 100. Though description will be given below with reference to EEPROM 103 and flash ROM 104, the non-volatile memory is not limited to EEPROM 103 and flash ROM 104 and any storage media such as at least two non-volatile memories different in characteristics from each other can be adopted as non-volatile memories of image formation apparatus 100.

EEPROM 103 is greater in allowable number of times of rewriting than flash ROM 104. For example, the allowable number of times of rewriting of EEPROM 103 is approximately one million times, whereas the allowable number of times of rewriting of flash ROM 104 is approximately one hundred thousand times. On the other hand, flash ROM 104 is higher in rate of reading than EEPROM 103.

Control device 101 is implemented, for example, by at least one integrated circuit. The integrated circuit is implemented, for example, by at least one central processing unit (CPU), at least one application specific integrated circuit (ASIC), at least one field programmable gate array (FPGA), or combination thereof.

Control device 101 performs processing for backing up control data for image formation apparatus 100 and processing for reading the backed up control data by performing processing in steps S1, S2, S3A, and S3B shown in FIG. 1. The "control data" herein refers to various types of data read and written in order to perform printing processing in image formation apparatus 100.

More specifically, in step S1, control device 101 performs various types of processing (for example, printing processing) onto image formation apparatus 100 by reading and writing control data 102A from and into RAM 102. Control data 102A is sequentially rewritten while the processing is being performed. Therefore, control device 101 backs up control data 102A in RAM 102 as precautionary measures against power failure or sudden cut-off of a power supply. In step S1, control device 101 backs up control data 102A in RAM 102 to EEPROM 103 as control data 103A. By way of example, back-up to EEPROM 103 is made each time control data 102A in RAM 102 is updated.

In step S2, control device 101 backs up control data 102A in RAM 102 to flash ROM 104 as control data 104A. A frequency of back-up of the control data to flash ROM 104 is lower than a frequency of back-up of the control data to EEPROM 103. The "frequency of back-up" herein refers to the number of times of back-up made per a prescribed period of time. With suppression of the number of times of rewriting of data to EEPROM 103, a lifetime of EEPROM 103 is extended.

Image formation apparatus 100 reads the control data from EEPROM 103 or flash ROM 104 based on acceptance of an operation start command after operations of image formation apparatus 100 are stopped. A source from which the control data is to be read is changed depending on whether or not control data 103A stored in EEPROM 103 matches with control data 104A stored in flash ROM 104.

More specifically, as shown in step S3A, when control data 103A stored in EEPROM 103 matches with control data 104A stored in flash ROM 104 at the time of start-up of image formation apparatus 100, control device 101 reads control data 104A from flash ROM 104 to RAM 102. By reading control data 104A from flash ROM 104 higher in rate of reading, a time period for start-up of image formation apparatus 100 can be shortened.

As shown in step S3B, when control data 103A stored in EEPROM 103 does not match with control data 104A stored in flash ROM 104 at the time of start-up of image formation apparatus 100, control device 101 reads control data 103A from EEPROM 103 to RAM 102.

Though an example in which functions for performing processing in each of steps S1, S2, S3A, and S3B are mounted on image formation apparatus 100 has been described above, these functions may be mounted on an apparatus other than image formation apparatus 100. For example, these functions may be mounted on a personal computer (PC), a smartphone, a tablet terminal, and other information processing apparatuses.

B. Internal Structure of Image Formation Apparatus 100

Figure 2:
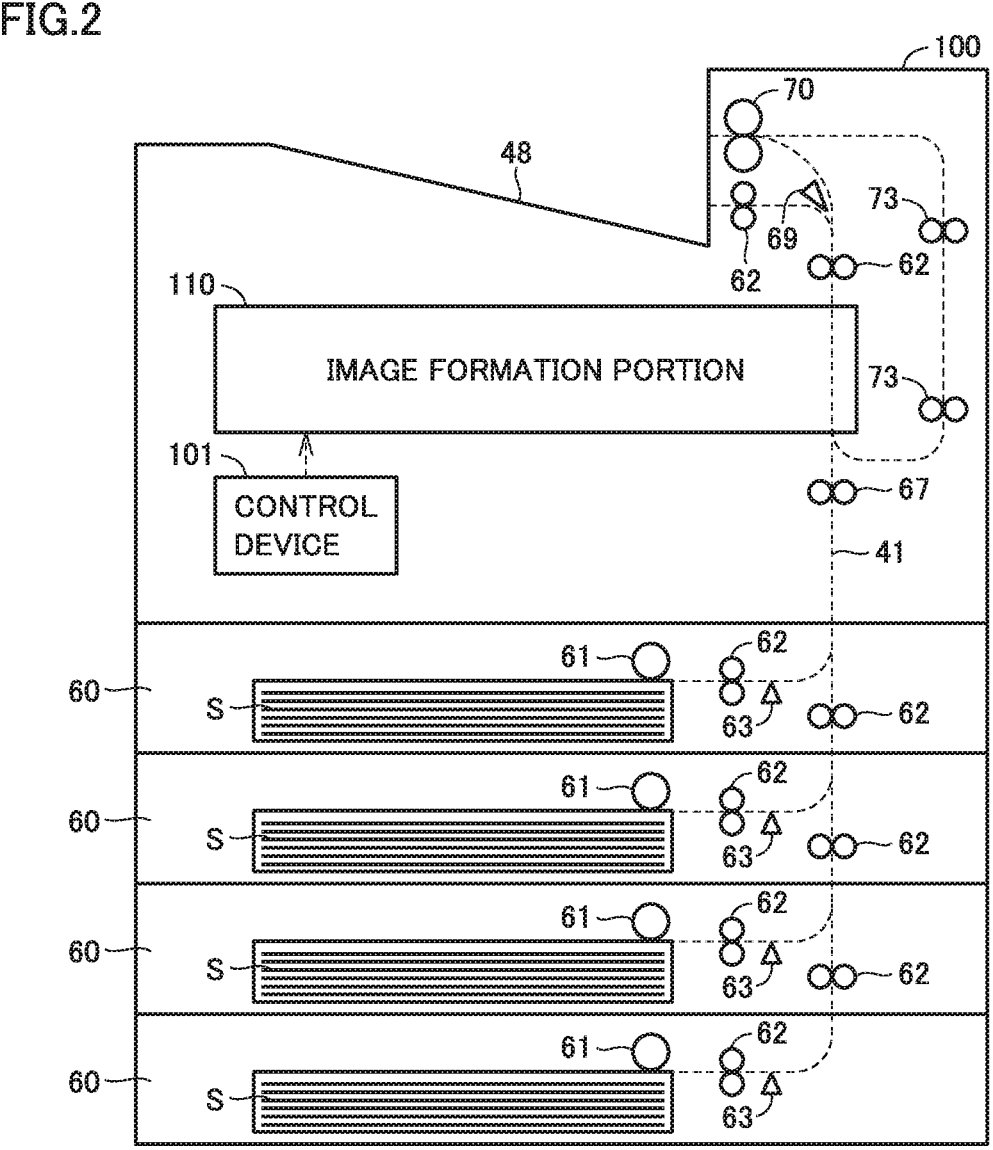
FIG. 2 is a diagram showing one example of an internal structure of the image formation apparatus according to the embodiment.

An internal structure of image formation apparatus 100 will be described with reference to FIG. 2. FIG. 2 is a diagram showing one example of the internal structure of image formation apparatus 100.

Image formation apparatus 100 may be a color printer, a monochrome printer, a facsimile machine, or a multi-functional peripheral (MFP) of a monochrome printer, a color printer, and a facsimile machine as being combined.

Image formation apparatus 100 includes a paper accommodation portion 60, a paper feed roller 61, paper transportation rollers 62 and 73, a paper sensor 63, a timing roller 67, a switching tab 69, an inverting roller 70, control device 101 for control of image formation apparatus 100, and an image formation portion 110 for printing a toner image onto paper.

Accommodation portion 60 is a cassette where paper is set. Accommodation portion 60 is constructed to be removable from image formation apparatus 100. A user can set paper S in accommodation portion 60 by removing accommodation portion 60 from image formation apparatus 100.

Paper feed roller 61 is connected to a motor (not shown) with a paper feed clutch (not shown) being interposed. The motor is controlled by control device 101. Control device 101 drives the motor based on reception of a printing instruction from a user. Control device 101 thus has paper feed roller 61 rotate with the paper feed clutch being interposed to send paper S one by one from accommodation portion 60 to a transportation path 41.

Paper S sent from accommodation portion 60 is transported through transportation path 41 by transportation roller 62. Transportation roller 62 is connected to a motor (not shown). The motor is controlled by control device 101. Control device 101 has paper feed roller 61 rotate by driving the motor to thereby transport paper S along transportation path 41.

Paper S sent from accommodation portion 60 is sent to image formation portion 110. Image formation portion 110 forms a toner image in accordance with an image pattern to be printed and prints the toner image on paper S. Sending of paper S to image formation portion 110 is timed by timing roller 67. The toner image formed in image formation portion 110 is thus printed at an appropriate position on paper S.

When image formation apparatus 100 has accepted an instruction for single-sided printing, control device 101 drives switching tab 69 and has paper S ejected on tray 48. When image formation apparatus 100 has accepted an instruction for double-sided printing, control device 101 drives switching tab 69 and has paper S sent to inverting roller 70. Thereafter, paper S is sent to transportation roller 73 and again passes through image formation portion 110. The toner image is thus printed on a rear surface of paper S and ejected on tray 48.

C. Internal Structure of Image Formation Portion 110

Figure 3:
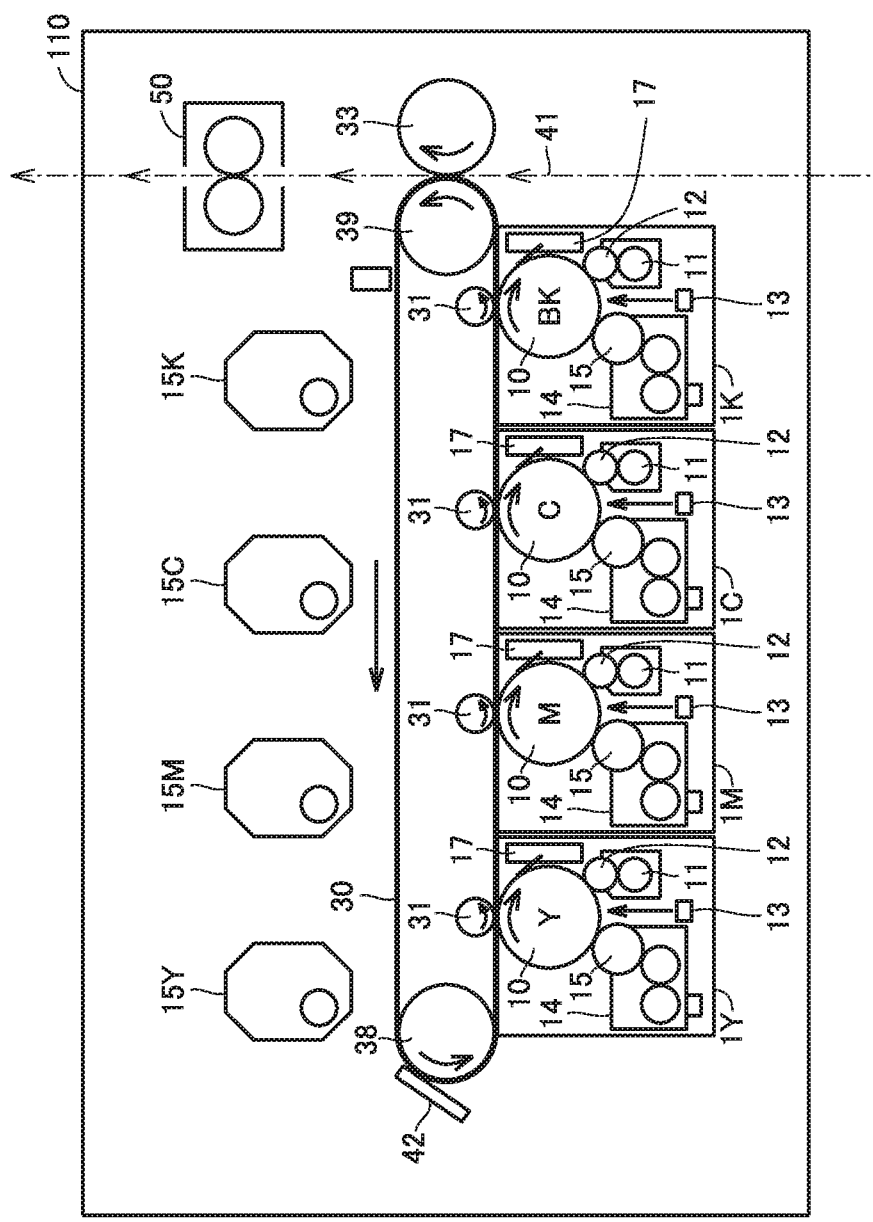
FIG. 3 is a diagram showing one example of an internal structure of an image formation portion according to the embodiment.

An internal structure of image formation portion 110 shown in FIG. 2 will be described with reference to FIG. 3. FIG. 3 is a diagram showing one example of the internal structure of image formation portion 110.

As shown in FIG. 3, image formation portion 110 includes image formation units 1Y, 1M, 1C, and 1K, toner bottles 15Y, 15M, 15C, and 15K, an intermediate transfer belt 30, a primary transfer roller 31, a secondary transfer roller 33, a driven roller 38, a drive roller 39, a cleaning apparatus 42, and a fixation apparatus 50.

Image formation unit 1Y forms a toner image of yellow (Y) on a photoconductor 10 upon receiving supply of toner from toner bottle 15Y. Image formation unit 1M forms a toner image of magenta (M) on photoconductor 10 upon receiving supply of toner from toner bottle 15M. Image formation unit 1C forms a toner image of cyan (C) on photoconductor 10 upon receiving supply of toner from toner bottle 15C. Image formation unit 1K forms a toner image of black (BK) on photoconductor 10 upon receiving supply of toner from toner bottle 15K.

Image formation units 1Y, 1M, 1C, and 1K are arranged sequentially in a direction of rotation of intermediate transfer belt 30 along intermediate transfer belt 30. Each of image formation units 1Y, 1M, 1C, and 1K includes photoconductor 10, a charging apparatus 11, an exposure apparatus 13, a development apparatus 14, and a cleaning apparatus 17.

Charging apparatus 11 includes a charging roller 12. Charging roller 12 abuts on photoconductor 10. Charging roller 12 evenly charges a surface of photoconductor 10 to a prescribed potential.

Exposure apparatus 13 irradiates photoconductor 10 with laser beams in response to a control signal from control device 101 shown in FIG. 2 and exposes a surface of photoconductor 10 in accordance with an input image pattern. An electrostatic latent image in accordance with an input image is thus formed on photoconductor 10.

Development apparatus 14 develops the electrostatic latent image formed on photoconductor 10 as a toner image. More specifically, development apparatus 14 applies a development bias to a development roller 15 while it rotates development roller 15, to thereby attach toner onto a surface of development roller 15. The toner is thus transferred from development roller 15 to photoconductor 10 and a toner image in accordance with the electrostatic latent image is developed on the surface of photoconductor 10.

Photoconductor 10 and intermediate transfer belt 30 are in contact with each other at a portion where primary transfer roller 31 is provided. A transfer voltage opposite in polarity to the toner image is applied to primary transfer roller 31 so that the toner image is transferred from photoconductor 10 to intermediate transfer belt 30. The toner image of yellow (Y), the toner image of magenta (M), the toner image of cyan (C), and the toner image of black (BK) are successively layered and transferred from photoconductor 10 to intermediate transfer belt 30. The color toner image is thus formed on intermediate transfer belt 30.

Intermediate transfer belt 30 is looped around driven roller 38 and drive roller 39. Drive roller 39 is connected to a motor (not shown). Drive roller 39 rotates under the control of the motor by control device 101. Intermediate transfer belt 30 and driven roller 38 rotate in coordination with drive roller 39. A toner image on intermediate transfer belt 30 is thus transported to secondary transfer roller 33.

Cleaning apparatus 17 recovers toner which remains on the surface of photoconductor 10 after transfer of the toner image from photoconductor 10 to intermediate transfer belt 30.

Secondary transfer roller 33 applies a transfer voltage opposite in polarity to the toner image to transported paper S. The toner image is thus attracted from intermediate transfer belt 30 to secondary transfer roller 33 and the toner image on intermediate transfer belt 30 is transferred. Timing of transportation of paper S to secondary transfer roller 33 is controlled by timing roller 67 (see FIG. 2) in accordance with a position of the toner image on intermediate transfer belt 30. Consequently, the toner image on intermediate transfer belt 30 is transferred to an appropriate position on paper S.

Fixation apparatus 50 pressurizes and heats paper S which passes therethrough. The toner image is thus fixed onto paper S.

Cleaning apparatus 42 recovers toner which remains on the surface of intermediate transfer belt 30 after the toner image is transferred from intermediate transfer belt 30 to paper S. The recovered toner is transported by a transportation screw (not shown) and stored in a waste toner container (not shown).

D. Circuit Configuration of Image Formation Apparatus 100

Figure 4:
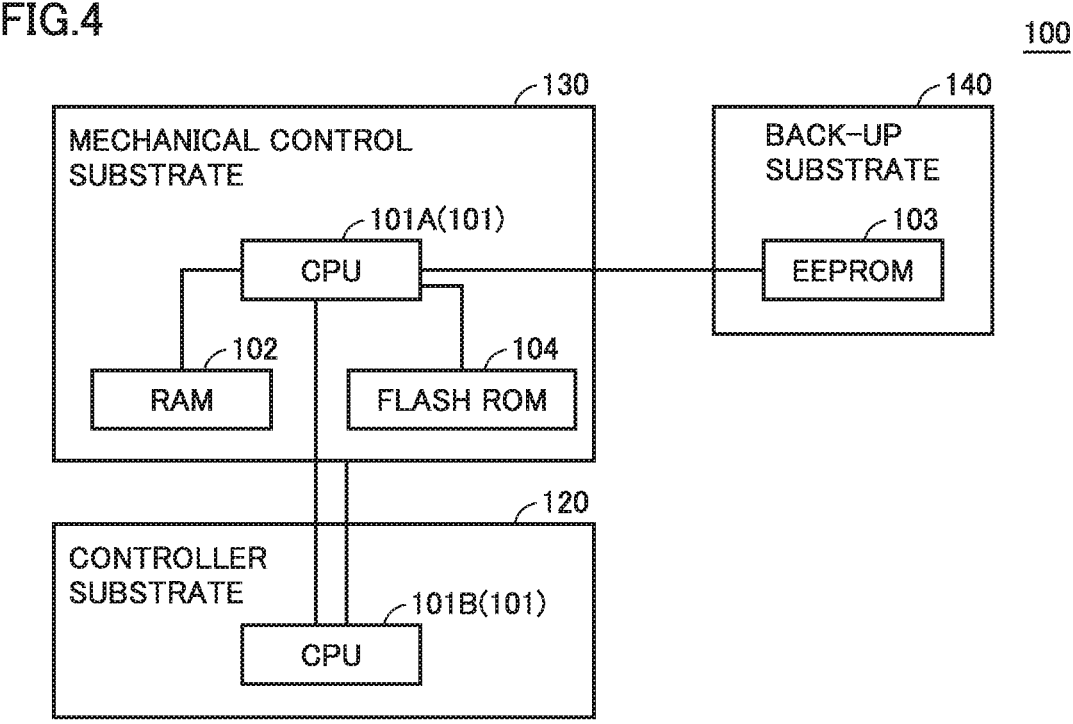
FIG. 4 is a diagram showing one example of connection relation among various substrates provided in the image formation apparatus according to the embodiment.

A circuit configuration of image formation apparatus 100 will be described with reference to FIG. 4. FIG. 4 is a diagram showing one example of connection relation among various substrates provided in image formation apparatus 100.

As shown in FIG. 4, image formation apparatus 100 includes a controller substrate 120, a mechanical control substrate 130, and a back-up substrate 140. Controller substrate 120 is provided with a CPU 101B. Mechanical control substrate 130 is provided with a CPU 101A, RAM 102, and flash ROM 104. Back-up substrate 140 is provided with EEPROM 103.

CPU 101A is electrically connected to CPU 101B, RAM 102, EEPROM 103, and flash ROM 104. CPU 101A and CPU 101B represent examples of control device 101 shown in FIG. 1. CPU 101A is configured to communicate with CPU 101B and performs various types of processing of image formation apparatus 100 in cooperation with CPU 101B. CPU 101B on controller substrate 120 controls, for example, power feed to various types of equipment on mechanical control substrate 130. CPU 101A (a control unit for equipment) on mechanical control substrate 130 controls various types of equipment in image formation apparatus 100.

E. Configuration of Mechanical Control Substrate 130

Figure 5:
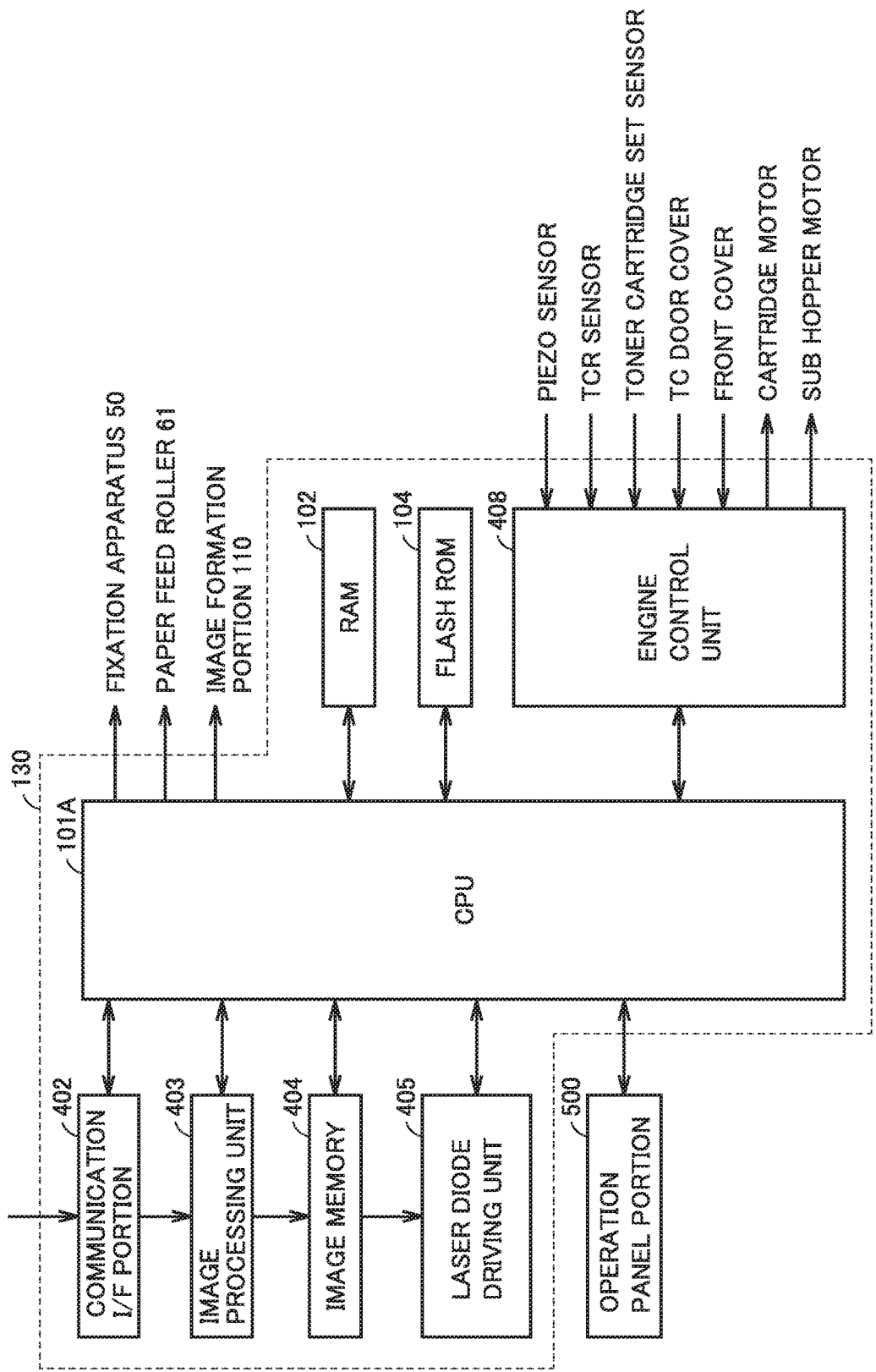
FIG. 5 is a block diagram showing a configuration of a substrate for control of mechanical components (mechanical control substrate) according to the embodiment.

A configuration of mechanical control substrate 130 shown in FIG. 4 will be described in detail with reference to FIG. 5. FIG. 5 is a block diagram showing a configuration of mechanical control substrate 130.

Referring to FIG. 5, mechanical control substrate 130 includes CPU 101A, RAM 102, flash ROM 104, a communication interface (I/F) portion 402, an image processing unit 403, an image memory 404, a laser diode driving unit 405, and an engine control unit 408.

Communication I/F portion 402 is an interface for connection to local area network (LAN) such as a LAN card or a LAN board and it receives data of a print job from the outside and sends the received data to image processing unit 403.

Image processing unit 403 converts data of the print job from communication I/F portion 402 to image data of reproduction colors of YMCK and outputs the image data to image memory 404, and has the image data stored for each reproduction color.

Laser diode driving unit 405 reads image data of each color from image memory 404 and starts up a laser diode of image formation portion 110 (see FIG. 2).

Flash ROM 104 stores data such as a table used for warm-up control and fixation control and further for control in addition to a control program relating to an image formation operation.

RAM 102 is used as a working area of CPU 101A. CPU 101A reads a necessary program from flash ROM 104, performs processing for converting image data in image processing unit 403, and writes/reads image data into/from image memory 404. CPU 101A controls operations of fixation apparatus 50, paper feed roller 61, and image formation portion 110 as a whole in a timed manner and realizes smooth printing operations.

Engine control unit 408 is electrically connected to a sensor or a motor in each portion. Engine control unit 408 accepts input of a sensor signal from each sensor and inputs the sensor signal to CPU 101A. Then, the engine control unit controls drive of each motor in accordance with a control signal from CPU 101A.

F. Functional Structure of Image Formation Apparatus 100

Figure 6:
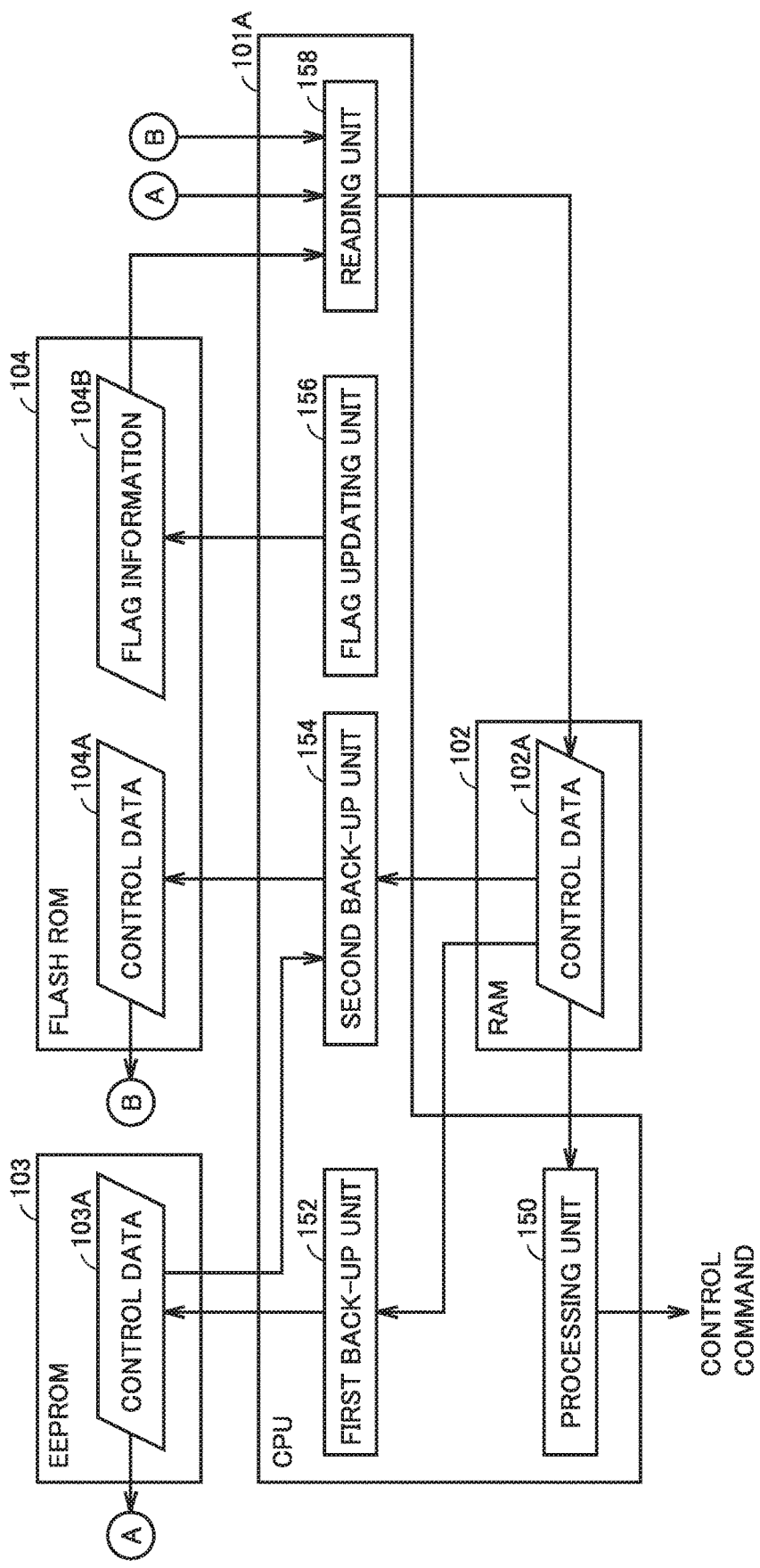
FIG. 6 is a diagram showing one example of a functional configuration of the image formation apparatus according to the embodiment.

Functions of image formation apparatus 100 will be described with reference to FIG. 6. FIG. 6 is a diagram showing one example of a functional configuration of image formation apparatus 100.

As shown in FIG. 6, image formation apparatus 100 includes as hardware components, CPU 101A, RAM 102, EEPROM 103, and flash ROM 104. CPU 101A includes, as the functional configuration, a processing unit 150, a first back-up unit 152, a second back-up unit 154, a flag updating unit 156, and a reading unit 158.

By referring to control data 102A developed on RAM 102, processing unit 150 performs processing for printing by image formation apparatus 100 and sequentially updates control data 102A in a process of performing the printing processing. By way of example, control data 102A includes a control parameter for fixation apparatus 50 (see FIG. 3), a control parameter for image formation by image formation apparatus 100, and a parameter representing a lifetime of consumable items in image formation apparatus 100. The control parameter for fixation apparatus 50 includes a fixation temperature for fixing a toner image to paper and a time period for temperature adjustment which represents a current degree of heating of fixation apparatus 50. The control parameter for image formation includes control parameters for image adjustment such as a maximum value of a voltage applied during printing, an atmospheric temperature and a humidity at the time of previous image adjustment, and a time when development apparatus 14 (see FIG. 3) stopped. The parameter which represents a lifetime of consumable items in image formation apparatus 100 includes, for example, cumulative pages printed until the current time point and a cumulative number of times of rotation of the photoconductor. Processing unit 150 performs processing for printing by image formation apparatus 100 by referring to such control data 102A.

First back-up unit 152 backs up control data 102A in RAM 102 to EEPROM 103 as control data 103 A. Processing for back-up to EEPROM 103 is performed at any timing. By way of example, processing for back-up to EEPROM 103 is performed each time control data 102A in RAM 102 is updated by processing unit 150 while image formation apparatus 100 is operating.

Second back-up unit 154 backs up control data 102A in RAM 102 to flash ROM 104 as control data 104A. A frequency of back-up of the control data to flash ROM 104 is lower than a frequency of back-up of the control data to EEPROM 103.

In one aspect, when second back-up unit 154 senses an off signal for turning off a power supply of image formation apparatus 100, the second back-up unit performs processing for backing up the control data to flash ROM 104. The processing for back-up to flash ROM 104 is thus performed immediately before the power supply of image formation apparatus 100 is turned off. Consequently, second back-up unit 154 can suppress the number of times of back-up to flash ROM 104 to the minimum and can achieve a longer lifetime of flash ROM 104.

In another aspect, when control data 103A stored in EEPROM 103 has not varied for a prescribed period of time, second back-up unit 154 performs processing for backing up the control data to flash ROM 104, details of which will be described later (see FIG. 9).

In another aspect, second back-up unit 154 backs up the control data to flash ROM 104 each time first back-up unit 152 backs up the control data to EEPROM 103 a prescribed number of times. Based on first back-up unit 152 having made back-up to EEPROM 103 a prescribed number of times, second back-up unit 154 makes back-up of the control data to flash ROM 104 once. The prescribed number of times is set, for example, to two or more. The number of times of back-up to flash ROM 104 is thus suppressed and a lifetime of flash ROM 104 is extended.

Typically, the allowable number of times of rewriting of EEPROM 103 is approximately one million, whereas the allowable number of times of rewriting of flash ROM 104 is approximately one hundred thousand. Therefore, the prescribed number of times is ten (=one million times/one hundred thousand times). Flash ROM 104 is thus comparable in lifetime to EEPROM 103.

Flag updating unit 156 updates flag information 104B. Flag information 104B shows whether or not control data 103A stored in EEPROM 103 matches with control data 104A stored in flash ROM 104. More specifically, when control data 103A and control data 104A match with each other, flag updating unit 156 updates flag information 104B so as to indicate a matched state (for example, true). When control data 103A and control data 104A do not match with each other, flag updating unit 156 updates flag information 104B so as to indicate an unmatched state (for example, false).

Reading unit 158 reads the control data from EEPROM 103 or flash ROM 104 to RAM 102 based on start-up of image formation apparatus 100. Reading unit 158 changes a source from which the control data is to be read based on flag information 104B. More specifically, when flag information 104B indicates the matched state (for example, true) at the time of start-up of image formation apparatus 100, reading unit 158 reads control data 104A from flash ROM 104 and writes control data 104A into RAM 102. When flag information 104B indicates the unmatched state (for example, false) at the time of start-up of image formation apparatus 100, reading unit 158 reads control data 103A from EEPROM 103 and writes control data 103A into RAM 102.

A time period for reading of the control data in flash ROM 104 is shorter by approximately 300 ms than a time period for reading of the control data in EEPROM 103. Therefore, when reading unit 158 reads control data 104A from flash ROM 104, a time period for start-up of image formation apparatus 100 can be shortened by approximately 300 ms.

Though FIG. 6 shows an example in which each functional feature is mounted on CPU 101A of mechanical control substrate 130, some or all of functional features shown in FIG. 6 may be mounted on CPU 101B of controller substrate 120, mounted on dedicated hardware, or mounted on an external apparatus such as a server.

G. Processing for Back-up to Flash ROM 104

As described above, image formation apparatus 100 backs up control data 102A to EEPROM 103 and backs up control data 102A to flash ROM 104. A frequency of back-up of control data 102A to flash ROM 104 is lower than a frequency of back-up of control data 102A to EEPROM 103. Processing for back-up to flash ROM 104 can be performed at any predetermined timing. First to third specific examples of processing for back-up to flash ROM 104 will be described below sequentially with reference to FIGS. 7 to 12.

Processing in FIGS. 7 to 12 is performed by execution of a program by CPU 101A on mechanical control substrate 130 or CPU 101B on controller substrate 120. For the sake of convenience of description, CPU 101A on mechanical control substrate 130 is also referred to as "CPU 101A for mechanical control" below and CPU 101B on controller substrate 120 is also referred to as "CPU 101B for controller."

G1. First Specific Example of Back-up Processing

Figure 7:
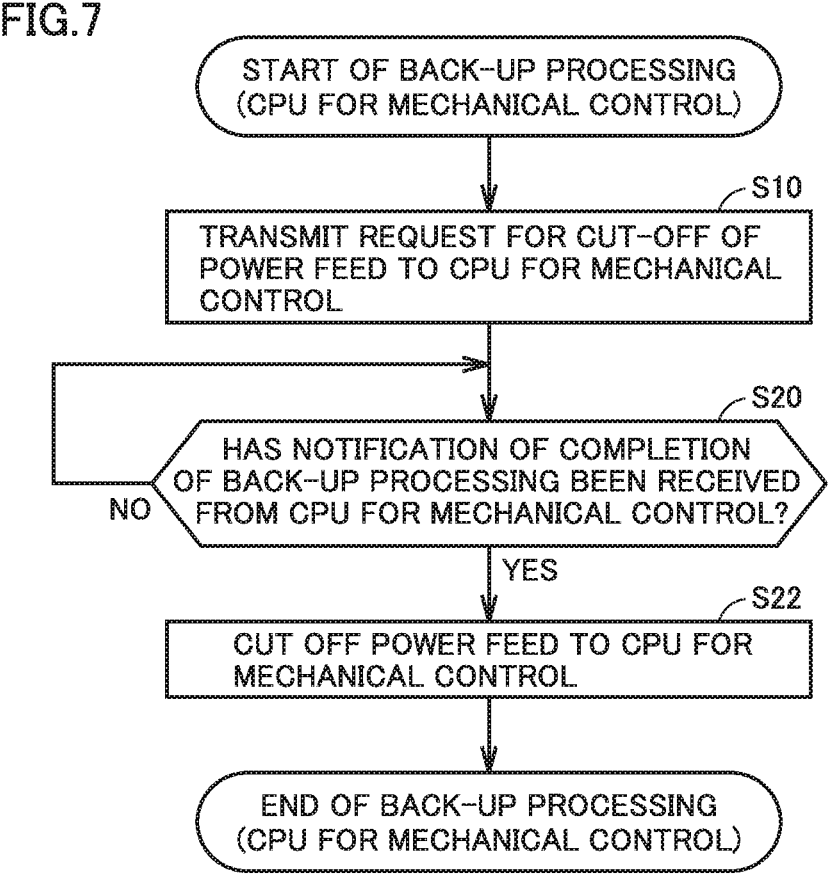
FIGS. 7 and 8 are diagrams showing a first specific example of processing for back-up to a flash ROM.
Figure 8:
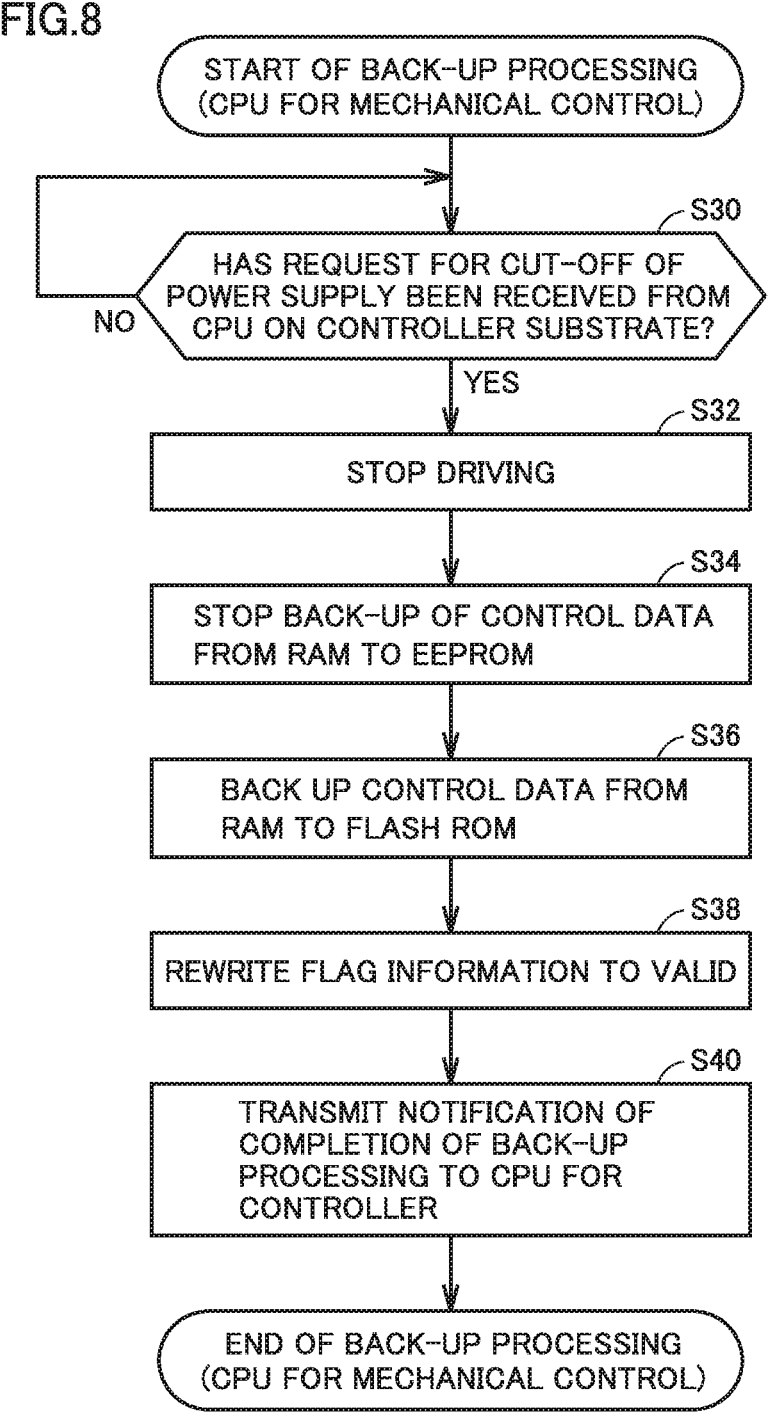

FIGS. 7 and 8 are diagrams showing the first specific example of processing for back-up to flash ROM 104. FIG. 7 shows processing performed by CPU 101B for controller. FIG. 8 shows processing performed by CPU 101A for mechanical control.

The present specific example is different from the back-up processing in the first specific example in that processing for back-up to flash ROM 104 is performed when an operation to turn off a power supply is performed onto image formation apparatus 100.

More specifically, in step S10. CPU 101B for controller transmits a request for cutting off power feed to CPU 101A for mechanical control. The request is issued, for example, based on an operation by a user to turn off the power supply onto image formation apparatus 100. Though details will be described later, CPU 101A for mechanical control performs processing for back-up to flash ROM 104 based on reception of a power feed cut-off request.

CPU 101B for controller determines in step S20 whether or not it has received a notification of completion of back-up processing from CPU 101A for mechanical control. When CPU 101B for controller determines that it has received notification of completion of back-up processing from CPU 101A for mechanical control (YES in step S20), the process switches to step S22. Otherwise (NO in step S20), CPU 101B for controller performs the processing in step S20 again.

In step S22, CPU 101B for controller cuts off power feed to CPU 101A for mechanical control.

Processing performed by CPU 101A for mechanical control will now be described with reference to FIG. 8.

CPU 101A for mechanical control determines in step S30 whether or not it has received a power supply cut-off request from CPU 101B for controller. When CPU 101A for mechanical control determines that it has received a power supply cut-off request from CPU 101B for controller (YES in step S30), the process switches to step S32. Otherwise (NO in step S30), CPU 101A for mechanical control performs the processing in step S30 again.

In step S32, CPU 101A for mechanical control stops driving all apparatuses in image formation apparatus 100.

In step S34, CPU 101A for mechanical control stops processing for back-up of control data from RAM 102 to EEPROM 103.

In step S36, CPU 101A for mechanical control as second back-up unit 154 (see FIG. 6) described above backs up the control data in RAM 102 to flash ROM 104. Preferably, CPU 101A for mechanical control erases data in a predetermined storage area in flash ROM 104 and writes the control data in RAM 102 into the storage area.

In step S38, CPU 101A for mechanical control as flag updating unit 156 (see FIG. 6) described above rewrites flag information 104B (see FIG. 6) to valid (the matched state).

In step S40, CPU 101A for mechanical control transmits a notification of completion of processing for back-up to flash ROM 104 to CPU 101A for controller.

As set forth above, when CPU 101 A for mechanical control accepts a power feed cut-off request from CPU 101B for controller, it has the control data backed up to flash ROM 104.

G2. Second Specific Example of Back-Up Processing

Figure 9:
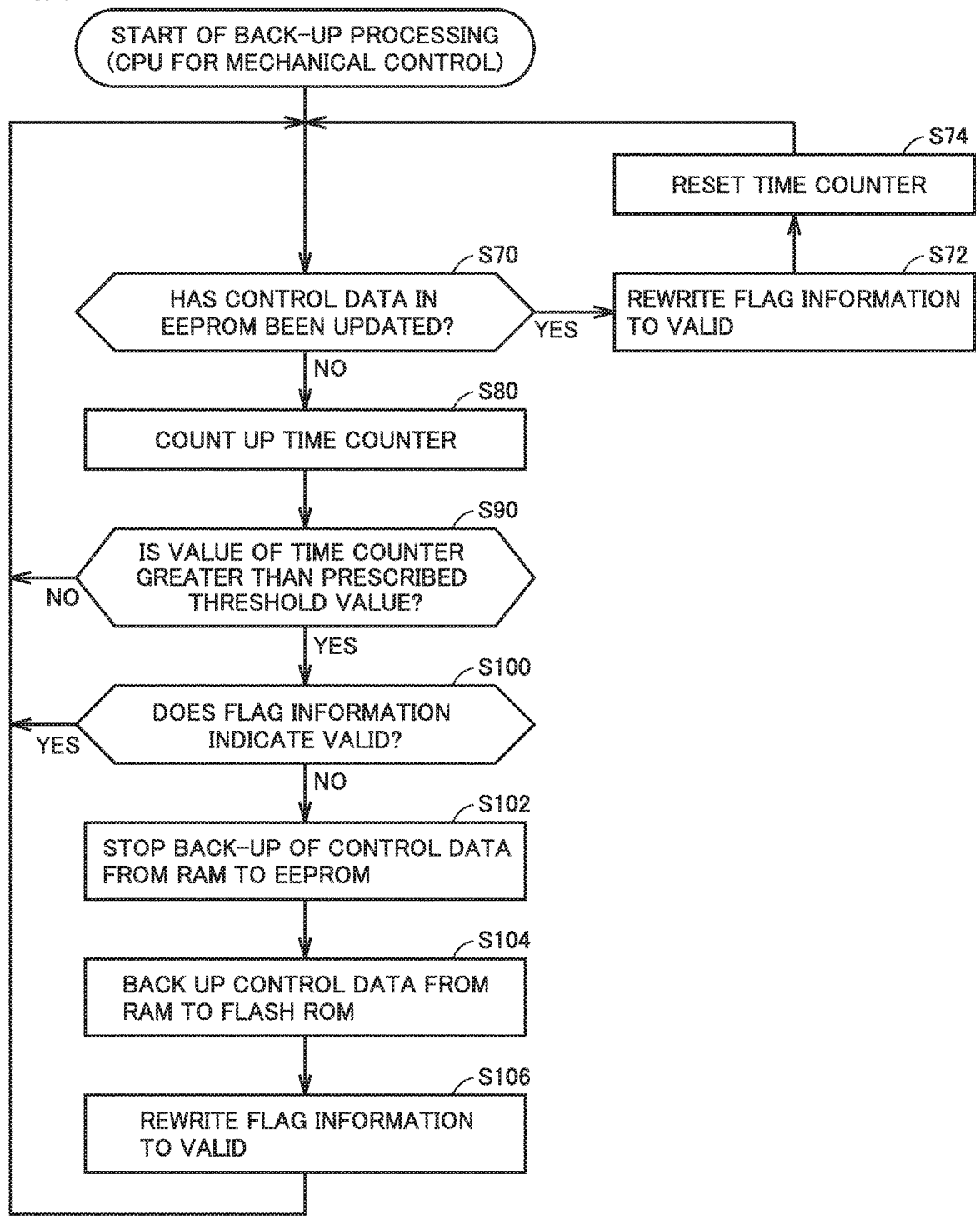
FIGS. 9 and 10 are diagrams showing a second specific example of processing for back-up to the flash ROM.
Figure 10:
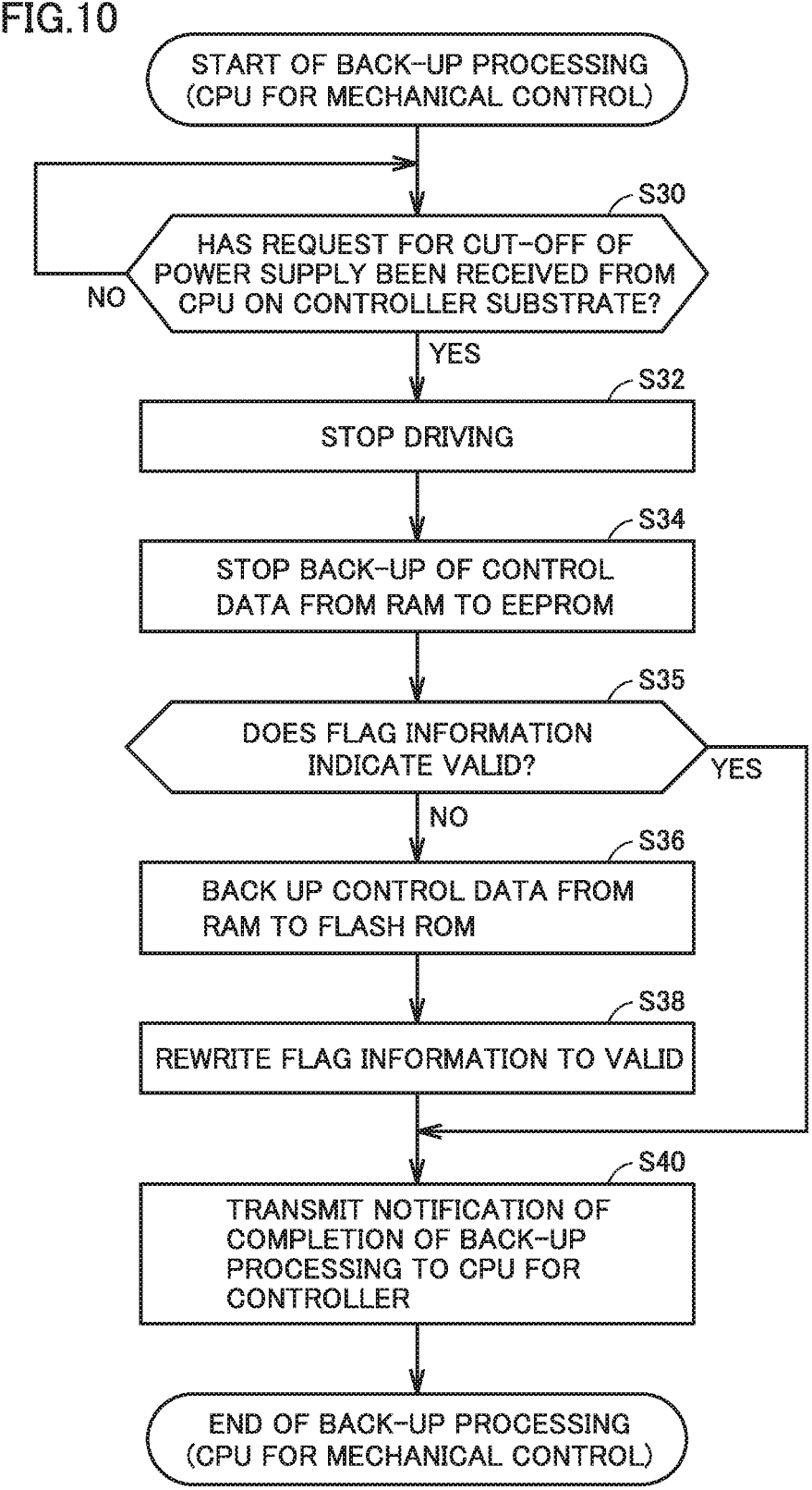

FIGS. 9 and 10 are diagrams showing the second specific example of processing for back-up to flash ROM 104.

In the present specific example, when the control data in EEPROM 103 has not been updated for a prescribed period of time, processing for back-up to flash ROM 104 is performed.

More specifically, CPU 101A for mechanical control determines in step S70 whether or not the control data in EEPROM 103 has been updated since previous checking. When CPU 101A for mechanical control determines that the control data in EEPROM 103 has been updated since previous checking (YES in step S70), the process switches to step S72. Otherwise (NO in step S70), the process switches to step S80.

In step S72, CPU 101A for mechanical control as flag updating unit 156 (see FIG. 6) described above rewrites flag information 104B (see FIG. 6) to valid.

In step S74, CPU 101A for mechanical control resets a time counter for counting time during which the control data in EEPROM 103 has not varied. Namely, the time counter is set to zero.

In step S80, CPU 101A for mechanical control counts up the time counter.

CPU 101A for mechanical control determines in step S90 whether or not a value of the time counter is greater than a prescribed threshold value. The prescribed threshold value may be set in advance or may arbitrarily be set by a user. The prescribed threshold value is set, for example, to ten minutes. When CPU 101A for mechanical control determines that the value of the time counter is greater than the prescribed threshold value (YES in step S90), the process switches to step S100. Otherwise (NO in step S90), the process returns to step S70.

CPU 101A for mechanical control determines in step S100 whether or not flag information 104B indicates valid. When CPU 101A for mechanical control determines that flag information 104B indicates valid (YES in step S100), the process returns to step S70. Otherwise (NO in step S100), the process switches to step S102.

In step S102, CPU 101A for mechanical control stops back-up of the control data from RAM 102 to EEPROM 103.

In step S104, CPU 101A for mechanical control as second back-up unit 154 (see FIG. 6) described above backs up the control data in RAM 102 to flash ROM 104. Preferably, CPU 101A for mechanical control erases data in a predetermined saving area in flash ROM 104 and writes the control data in RAM 102 into the saving area.

In step S106, CPU 101A for mechanical control as flag updating unit 156 (see FIG. 6) described above rewrites flag information 104B described above to valid the matched state).

When back-up from RAM 102 to EEPROM 103 has thus not been made for a prescribed period of time, CPU 101A for mechanical control makes back-up from RAM 102 to flash ROM 104.

Back-up processing at the time when a power supply cut-off request is received will now be described with reference to FIG. 10. The present specific example is different from the processing shown in FIG. 8 in that processing in step S35 is further performed. Since processing other than the processing in step S35 is as described above with reference to FIG. 8, description thereof will not be repeated below.

CPU 101A for mechanical control determines in step S35 whether or not flag information 104B indicates valid. When CPU 101A for mechanical control determines that flag information 104B indicates valid (YES in step S35), the process switches to step S40. Otherwise (NO in step S35), the process switches to step S36.

When the control data in flash ROM 104 thus matches with the control data in EEPROM 103, processing in steps S36 and S38 is not performed. In this case, CPU 101A for mechanical control determines that back-up to flash ROM 104 has already been made and does not make back-up to flash ROM 104. A processing time period at the time when the power supply is cut off is thus shortened.

G3. Third Specific Example of Back-up Processing

In the present specific example, CPU 101B for controller not only transmits a power supply cut-off request to CPU 101A for mechanical control but also further transmits a power supply cut-off factor. CPU 101A for mechanical control determines whether or not to make back-up to flash ROM 104 based on the received power supply cut-off factor. Processing in the third specific example is otherwise the same as the back-up processing in the first specific example.

Figure 11:
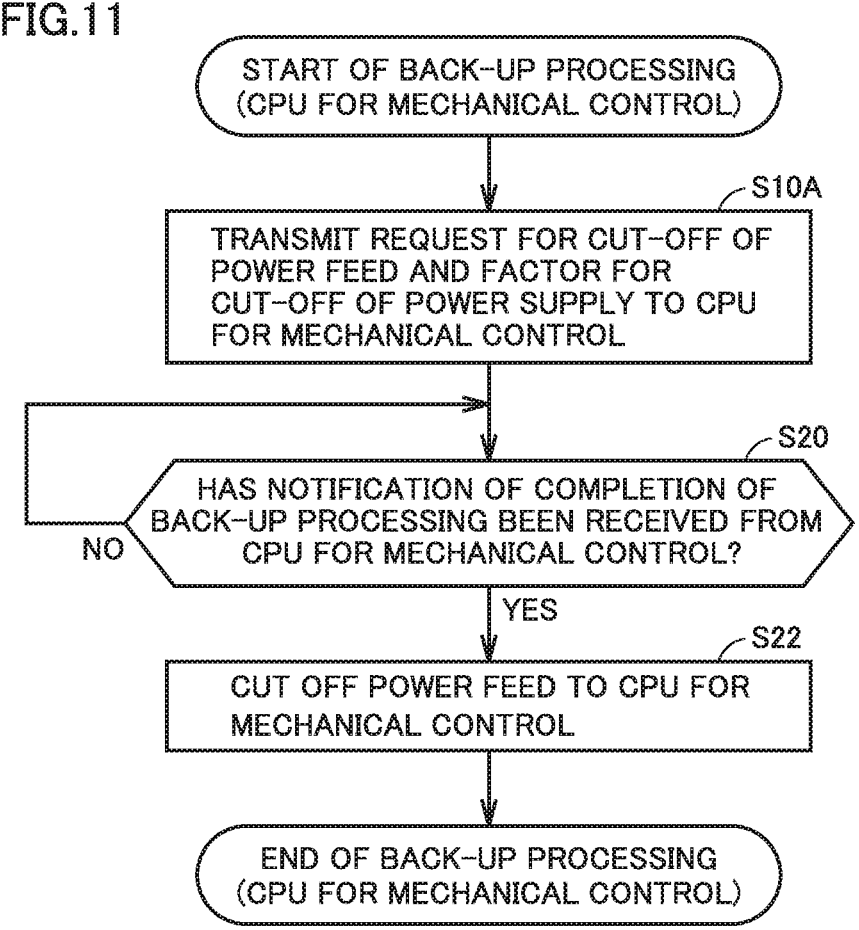
FIGS. 11 and 12 are diagrams showing a third specific example of processing for back-up to the flash ROM.
Figure 12:
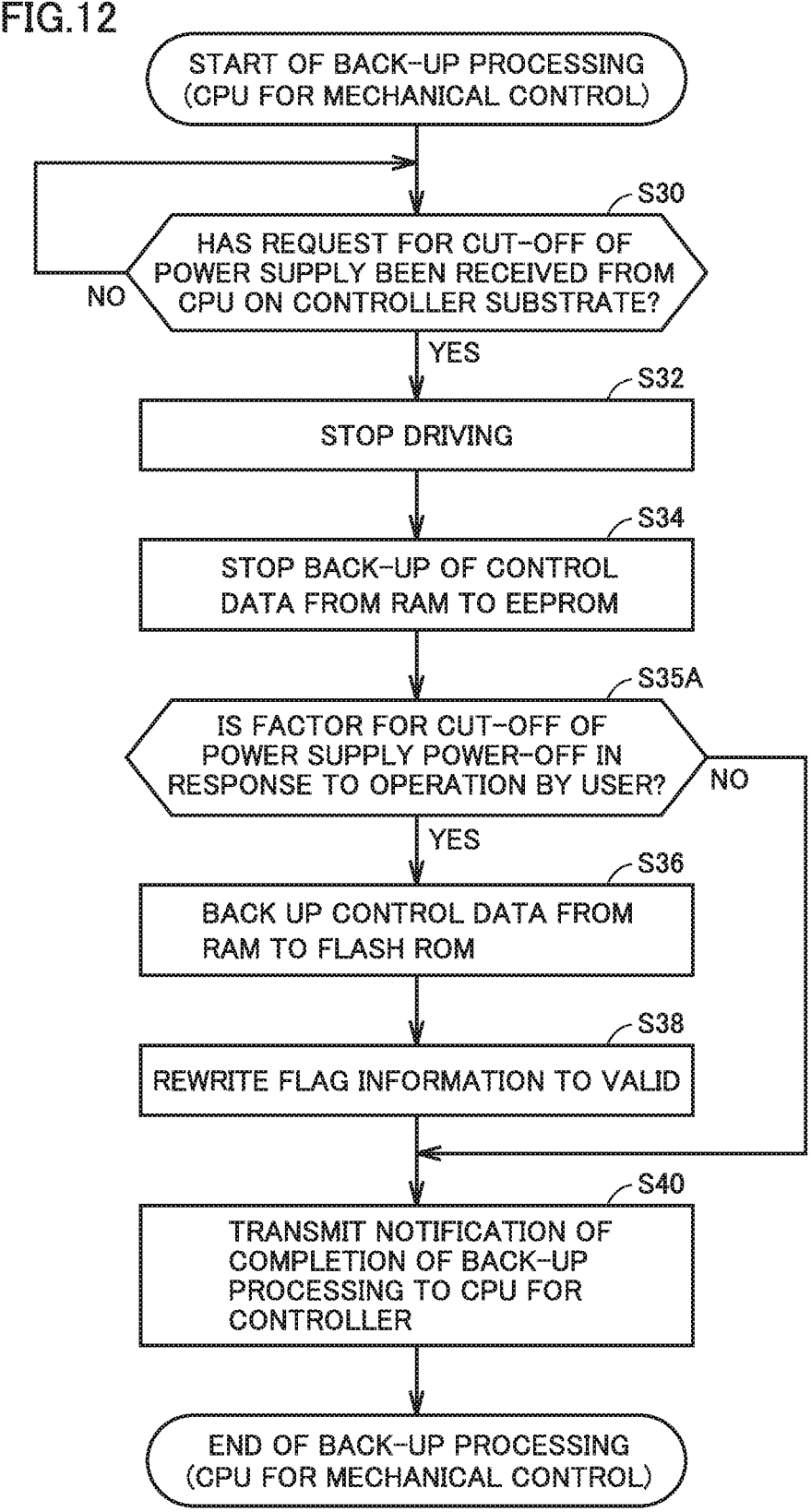

FIGS. 11 and 12 are diagrams showing the third specific example of processing for back-up to flash ROM 104. FIG.

11 shows processing performed by CPU 101B for controller. FIG. 12 shows processing performed by CPU 101A for mechanical control.

The present specific example is different from the processing shown in FIG. 7 in that processing in step S10A is performed instead of step S10 shown in FIG. 7. Since processing other than the processing in step S10A is as described with reference to FIG. 7, description thereof will not be repeated below.

In step S10A, CPU 101B for controller transmits a request for cutting off power feed and a power feed cut-off factor to CPU 101A for mechanical control. A type of power feed cut-off factor to be transmitted includes power-off in response to an operation by a user and power-off as a result of transition to an energy saving mode. The energy saving mode is an operation mode in which power consumption is lower than in a normal mode.

Back-up processing at the time when a power supply cut-off request is received will now be described with reference to FIG. 12. The present specific example is different from the processing shown in FIG. 8 in that processing in step S35A is further performed. Since processing other than the processing in step S35A is as described with reference to FIG. 8, description thereof will not be repeated below.

CPU 101A for mechanical control determines in step S35A whether or not a power supply cut-off factor received from CPU 101B for controller is power-off in response to an operation by a user. When CPU 101A for mechanical control determines that the power supply cut-off factor received from CPU 101B for controller is power-off in response to the operation by the user (YES in step S35A), the process switches to step S36. Otherwise (NO in step S35A), the process switches to step S40.

Processing in steps S36 and S38 is thus performed only when the power supply cut-off factor is power-off in response to an operation by a user. CPU 101A for mechanical control does not make back-up to flash ROM 104 in response to transition of the operation mode of image formation apparatus 100 from the normal mode to the energy saving mode. Since transition to the energy saving mode is frequently made, a lifetime of flash ROM 104 is extended as a result of absence of processing for back-up to flash ROM 104 due to transition to the energy saving mode.

H. Start-up Processing in Image Formation Apparatus 100

Processing for starting up image formation apparatus 100 will be described with reference to FIG. 13. FIG. 13 is a diagram showing a specific example of processing for starting up image formation apparatus 100.

In step S200, CPU 101A for mechanical control reads flag information 104B (see FIG. 6) described above from flash ROM 104 to RAM 102 based on reception of a start-up command from CPU 101B for controller. The start-up command is issued, for example, when an operation to turn on power is accepted from a user.

CPU 101A for mechanical control determines in step S210 whether or not flag information 104B indicates valid (the matched state). When CPU 101A for mechanical control determines that flag information 104B indicates valid (YES in step S210), the process switches to step S212. Otherwise (NO in step S210), the process switches to step S216.

In step S212, CPU 101A for mechanical control as reading unit 158 (see FIG. 6) described above reads control data 104A from flash ROM 104 to RAM 102.

In step S214, CPU 101A for mechanical control as flag updating unit 156 (see FIG. 6) described above rewrites flag information 104B to invalid.

In step S216, CPU 101A for mechanical control as reading unit 158 described above reads control data 103A from EEPROM 103 to RAM 102.

In step S220, CPU 101A for mechanical control as processing unit 150 (see FIG. 6) described above performs printing preparation processing based on the control data developed on RAM 102. By way of example, CPU 101A for mechanical control determines a target temperature of fixation apparatus 50 based on the control data developed on RAM 102 and starts temperature adjustment processing such that fixation apparatus 50 attains to the target temperature.

I. Back-up Area

A back-up area in flash ROM 104 will be described with reference to FIG. 14. FIG. 14 is a conceptual diagram schematically showing a storage area of flash ROM 104.

As shown in FIG. 14, a storage area for a control program for control of image formation apparatus 100 and a back-up area for control data used for the control program are allocated in advance in flash ROM 104. In the example in FIG. 14, a storage area from an address "0x00000000" to an address "0x10000000" is allocated as an area for storing a control program and a storage area from an address "0x10000000" to an address "0x10020000" is allocated as a back-up area.

When the control data is backed up to EEPROM 103, CPU 101A for mechanical control erases data in the back-up area in flash ROM 104 and then writes the control data in RAM 102 into the back-up area. When the control program is updated, CPU 101A for mechanical control erases the data in the program storage area in flash ROM 104 and then writes the updated control program into the program storage area.

J. Summary

As set forth above, image formation apparatus 100 includes first back-up unit 152 configured to back up control data 102A for image formation apparatus 100 to EEPROM 103 and second back-up unit 154 configured to back up control data 102A for image formation apparatus 100 to flash ROM 104. A frequency of back-up of control data 102A to flash ROM 104 is lower than a frequency of back-up of control data 102A to EEPROM 103. A lifetime of flash ROM 104 can thus be extended.

When the control data stored in EEPROM 103 matches with the control data stored in flash ROM 104 at the time of start-up of image formation apparatus 100, image formation apparatus 100 reads the control data from flash ROM 104 to RAM 102. When the control data stored in EEPROM 103 does not match with the control data stored in flash ROM 104 at the time of start-up of image formation apparatus 100, image formation apparatus 100 reads the control data from EEPROM 103 to RAM 102. Since flash ROM 104 is shorter in time of reading than EEPROM 103, image formation apparatus 100 can achieve a time period for start-up shorter than in an example in which control data is read each time from EEPROM 103.

As set forth above, image formation apparatus 100 can achieve a shortened time period for starting up image formation apparatus 100 while a lifetime of flash ROM 104 is extended.

K. Additional Aspects

According to one aspect, an image formation apparatus includes a first non-volatile memory, a second non-volatile memory smaller in allowable number of times of rewriting of data than the first non-volatile memory and higher in rate of reading of data than the first non-volatile memory, a first back-up unit configured to back up control data used at the time of start-up of the image formation apparatus to the first non-volatile memory, and a second back-up unit configured to back up the control data to the second non-volatile memory. A frequency of back-up of the control data to the second non-volatile memory is lower than a frequency of back-up of the control data to the first non-volatile memory. The image formation apparatus further includes a reading unit configured to read the control data from the second non-volatile memory when the control data stored in the first non-volatile memory matches with the control data stored in the second non-volatile memory at the time of start-up of the image formation apparatus and read the control data from the first non-volatile memory when the control data stored in the first non-volatile memory does not match with the control data stored in the second non-volatile memory at the time of start-up of the image formation apparatus.

Preferably, the image formation apparatus further includes an updating unit configured to update flag information so as to indicate a matched state when the control data stored in the first non-volatile memory matches with the control data stored in the second non-volatile memory and to update the flag information so as to indicate an unmatched state when the control data stored in the first non-volatile memory does not match with the control data stored in the second non-volatile memory. The reading unit reads the control data from the second non-volatile memory when the flag information indicates the matched state at the time of start-up of the image formation apparatus and reads the control data from the first non-volatile memory when the flag information indicates the unmatched state at the time of start-up of the image formation apparatus.

Preferably, the second back-up unit backs up the control data to the second non-volatile memory when it senses an off signal for turning off a power supply of the image formation apparatus.

Preferably, the second back-up unit backs up the control data to the second non-volatile memory when the control data stored in the first non-volatile memory has not varied for a prescribed period of time.

Preferably, the second back-up unit backs up the control data to the second non-volatile memory each time the control data is backed up to the first non-volatile memory a prescribed number of times. The prescribed number of times is set to two or more.

Preferably, the image formation apparatus includes as operation modes, a normal mode and an energy saving mode in which power consumption is lower than in the normal mode. The second back-up unit does not back up the control data to the second non-volatile memory in response to transition of the operation mode of the image formation apparatus from the normal mode to the energy saving mode.

Preferably, the image formation apparatus further includes a control unit for equipment configured to control equipment in the image formation apparatus. The second back-up unit backs up the control data to the second non-volatile memory when it accepts a request for cut-off of power feed to the control unit for equipment.

Preferably, the second non-volatile memory includes a program storage area where a control program for control of the image formation apparatus is stored and a data storage area where the control data used by the control program is stored.

Preferably, the image formation apparatus further includes a fixation apparatus configured to fix with heat, a toner image on paper onto the paper. The control data to be backed up by the first back-up unit and the second back-up unit includes a parameter for adjustment of a fixation temperature in the fixation apparatus.

Preferably, the control data to be backed up by the first back-up unit and the second back-up unit includes a parameter for formation of an image by the image formation apparatus.

Preferably, the image formation apparatus further includes a volatile memory capable of holding the control data only while electric power is fed. The first back-up unit backs up the control data stored in the volatile memory to the first non-volatile memory. The second back-up unit backs up the control data stored in the volatile memory to the second non-volatile memory.

According to another aspect, an information processing apparatus includes a first non-volatile memory, a second non-volatile memory smaller in allowable number of times of rewriting of data than the first non-volatile memory and higher in rate of reading of data than the first non-volatile memory, a first back-up unit configured to back up control data used at the time of start-up of the information processing apparatus to the first non-volatile memory, and a second back-up unit configured to back up the control data to the second non-volatile memory. A frequency of back-up of the control data to the second non-volatile memory is lower than a frequency of back-up of the control data to the first non-volatile memory. The information processing apparatus further includes a reading unit configured to read the control data from the second non-volatile memory when the control data stored in the first non-volatile memory matches with the control data stored in the second non-volatile memory at the time of start-up of the information processing apparatus and to read the control data from the first non-volatile memory when the control data stored in the first non-volatile memory does not match with the control data stored in the second non-volatile memory at the time of start-up of the information processing apparatus.

According to another aspect, an information processing method in an information processing apparatus is provided. The information processing apparatus includes a first non-volatile memory and a second non-volatile memory smaller in allowable number of times of rewriting of data than the first non-volatile memory and higher in rate of reading of data than the first non-volatile memory. The information processing method includes backing up control data used at the time of start-up of the information processing apparatus to the first non-volatile memory and backing up the control data to the second non-volatile memory. A frequency of back-up of the control data to the second non-volatile memory is lower than a frequency of back-up of the control data to the first non-volatile memory. The information processing method further includes reading the control data from the second non-volatile memory when the control data stored in the first non-volatile memory matches with the control data stored in the second non-volatile memory at the time of start-up of the information processing apparatus and reading the control data from the first non-volatile memory when the control data stored in the first non-volatile memory does not match with the control data stored in the second non-volatile memory at the time of start-up of the information processing apparatus.

According to another aspect, an information processing program executed by an information processing apparatus is provided. The information processing apparatus includes a first non-volatile memory and a second non-volatile memory smaller in allowable number of times of rewriting of data than the first non-volatile memory and higher in rate of reading of data than the first non-volatile memory. The information processing program causes the information processing apparatus to perform backing up control data used at the time of start-up of the information processing apparatus to the first non-volatile memory and backing up the control data to the second non-volatile memory. A frequency of back-up of the control data to the second non-volatile memory is lower than a frequency of back-up of the control data to the first non-volatile memory. The information processing program further causes the information processing apparatus to perform reading the control data from the second non-volatile memory when the control data stored in the first non-volatile memory matches with the control data stored in the second non-volatile memory at the time of start-up of the information processing apparatus and reading the control data from the first non-volatile memory when the control data stored in the first non-volatile memory does not match with the control data stored in the second non-volatile memory at the time of start-up of the information processing apparatus.

Although embodiments of the present invention have been described and illustrated in detail, the disclosed embodiments are made for the purposes of illustration and example only and not limitation. The scope of the present invention should be interpreted by terms of the appended claims.

What is claimed is:

1. An image formation apparatus comprising:
   a first non-volatile memory;
   a second non-volatile memory smaller in allowable number of times of rewriting of data than the first non-volatile memory and higher in rate of reading of data than the first non-volatile memory; and
   a processor which controls the image formation apparatus, the processor being configured to perform operations including:
      backing up control data used in start-up of the image formation apparatus to the first non-volatile memory,
      backing up the control data to the second non-volatile memory less frequently than to the first non-volatile memory,
      determining whether the control data stored in the first non-volatile memory matches the control data stored in the second non-volatile memory during start-up of the image formation apparatus,
      reading the control data from the second non-volatile memory when the control data stored in the first non-volatile memory matches the control data stored in the second non-volatile memory and reading the control data from the first non-volatile memory when the control data stored in the first non-volatile memory does not match the control data stored in the second non-volatile memory,
      updating flag information to indicate a matched state when the control data stored in the first non-volatile memory matches the control data stored in the second non-volatile memory and updating the flag information to indicate an unmatched state when the control data stored in the first non-volatile memory does not match the control data stored in the second non-volatile memory,
      reading the control data from the second non-volatile memory when the flag information indicates the matched state during the start-up of the image formation apparatus, and
      reading the control data from the first non-volatile memory when the flag information indicates the unmatched state during the start-up of the image formation apparatus.

2. The image formation apparatus according to claim 1, wherein the processor is further configured to back up the control data to the second non-volatile memory when the processor senses an off signal for turning off a power supply of the image formation apparatus.

3. The image formation apparatus according to claim 1, wherein the processor is further configured to back up the control data to the second non-volatile memory when the control data stored in the first non-volatile memory has not varied for a prescribed period of time.

4. The image formation apparatus according to claim 1, wherein the processor is further configured to back up the control data to the second non-volatile memory each time the control data is backed up to the first non-volatile memory a prescribed number of times, and the prescribed number of times is set to at least two.

5. The image formation apparatus according to claim 1, wherein:
   the image formation apparatus includes, as operation modes, a normal mode and an energy saving mode which has lower power consumption than the normal mode, and
   the processor does not back up the control data to the second non-volatile memory when the operation mode of the image formation apparatus switches from the normal mode to the energy saving mode.

6. The image formation apparatus according to claim 1, wherein the processor further controls equipment in the image formation apparatus, and the processor is configured to back up the control data to the second non-volatile memory when the processor accepts a request for cut-off of power feed.

7. The image formation apparatus according to claim 1, wherein the second non-volatile memory includes a program storage area where a control program for control of the image formation apparatus is stored and a data storage area where the control data used by the control program is stored.

8. The image formation apparatus according to claim 1, further comprising a fixation apparatus which fixes, with heat, a toner image onto paper, wherein the control data to be backed up by the processor includes a parameter for adjustment of a fixation temperature in the fixation apparatus.

9. The image formation apparatus according to claim 1, wherein the control data to be backed up by the processor includes a parameter for formation of an image by the image formation apparatus.

10. The image formation apparatus according to claim 1, further comprising a volatile memory which holds the control data only while electric power is fed,
   wherein the processor is configured to back up the control data stored in the volatile memory to the first non-volatile memory, and back up the control data stored in the volatile memory to the second non-volatile memory.

11. An information processing apparatus comprising:
   a first non-volatile memory;
   a second non-volatile memory smaller in allowable number of times of rewriting of data than the first non-volatile memory and higher in rate of reading of data than the first non-volatile memory; and a processor which controls the information processing apparatus, the processor being configured to perform operations including:

backing up control data used in start-up of the information processing apparatus to the first non-volatile memory, backing up the control data to the second non-volatile memory less frequently than to the first non-volatile memory, determining whether the control data stored in the first non-volatile memory matches the control data stored in the second non-volatile memory during start-up of the image formation apparatus, reading the control data from the second non-volatile memory when the control data stored in the first non-volatile memory matches the control data stored in the second non-volatile memory and reading the control data from the first non-volatile memory when the control data stored in the first non-volatile memory does not match the control data stored in the second non-volatile memory, updating flag information to indicate a matched state when the control data stored in the first non-volatile memory matches the control data stored in the second non-volatile memory and updating the flag information to indicate an unmatched state when the control data stored in the first non-volatile memory does not match the control data stored in the second non-volatile memory, reading the control data from the second non-volatile memory when the flag information indicates the matched state during the start-up of the information processing apparatus, and reading the control data from the first non-volatile memory when the flag information indicates the unmatched state during the start-up of the information processing apparatus.

12. The information processing apparatus according to claim 11, wherein the processor is further configured to back up the control data to the second non-volatile memory when the processor senses an off signal for turning off a power supply of the information processing apparatus.

13. The information processing apparatus according to claim 11, wherein the processor is further configured to back up the control data to the second non-volatile memory when the control data stored in the first non-volatile memory has not varied for a prescribed period of time.

14. The information processing apparatus according to claim 11, wherein the processor is further configured to back up the control data to the second non-volatile memory each time the control data is backed up to the first non-volatile memory a prescribed number of times, and the prescribed number of times is set to at least two.

15. The information processing apparatus according to claim 11, wherein:

the information processing apparatus includes, as operation modes, a normal mode and an energy saving mode which has lower power consumption than the normal mode, and the processor does not back up the control data to the second non-volatile memory when the operation mode of the information processing apparatus switches from the normal mode to the energy saving mode.

16. The information processing apparatus according to claim 11, wherein the processor further controls equipment in the information processing apparatus, and the processor is configured to back up the control data to the second non-volatile memory when the processor accepts a request for cut-off of power feed.

17. An information processing method in an information processing apparatus, the information processing apparatus including a first non-volatile memory and a second non-volatile memory smaller in allowable number of times of rewriting of data than the first non-volatile memory and higher in rate of reading of data than the first non-volatile memory, the information processing method comprising:

backing up control data used in start-up of the information processing apparatus to the first non-volatile memory;

backing up the control data to the second non-volatile memory less frequently than to the first non-volatile memory;

determining whether the control data stored in the first non-volatile memory matches the control data stored in the second non-volatile memory during start-up of the image formation apparatus;

reading the control data from the second non-volatile memory when the control data stored in the first non-volatile memory matches the control data stored in the second non-volatile memory and reading the control data from the first non-volatile memory when the control data stored in the first non-volatile memory does not match the control data stored in the second non-volatile memory;

updating flag information to indicate a matched state when the control data stored in the first non-volatile memory matches the control data stored in the second non-volatile memory and updating the flag information to indicate an unmatched state when the control data stored in the first non-volatile memory does not match the control data stored in the second non-volatile memory;

reading the control data from the second non-volatile memory when the flag information indicates the matched state during the start-up of the information processing apparatus; and reading the control data from the first non-volatile memory when the flag information indicates the unmatched state during the start-up of the information processing apparatus.

18. A non-transitory recording medium storing a computer readable information processing program that controls an information processing apparatus, the information processing apparatus including a first non-volatile memory and a second non-volatile memory smaller in allowable number of times of rewriting of data than the first non-volatile memory and higher in rate of reading of data than the first non-volatile memory, wherein the information processing program, when executed by a computer of the information processing apparatus, controls the computer to perform operations comprising:

backing up control data used in start-up of the information processing apparatus to the first non-volatile memory;

backing up the control data to the second non-volatile memory less frequently than to the first non-volatile memory;

determining whether the control data stored in the first non-volatile memory matches the control data stored in the second non-volatile memory during start-up of the image formation apparatus;

reading the control data from the second non-volatile memory when the control data stored in the first non-volatile memory matches the control data stored in the second non-volatile memory and reading the control data from the first non-volatile memory when the control data stored in the first non-volatile memory does not match the control data stored in the second non-volatile memory;

updating flag information to indicate a matched state when the control data stored in the first non-volatile memory matches the control data stored in the second non-volatile memory and updating the flag information to indicate an unmatched state when the control data stored in the first non-volatile memory does not match the control data stored in the second non-volatile memory;

reading the control data from the second non-volatile memory when the flag information indicates the matched state during the start-up of the information processing apparatus; and reading the control data from the first non-volatile memory when the flag information indicates the unmatched state during the start-up of the information processing apparatus.

\* \* \* \* \*